T. LIDBERG.
METHOD OF CONTROLLING TEMPERATURES.
APPLICATION FILED JAN. 9, 1919.
1,327,207.
Patented Jan. 6, 1920.
4 SHEETS—SHEET 1.
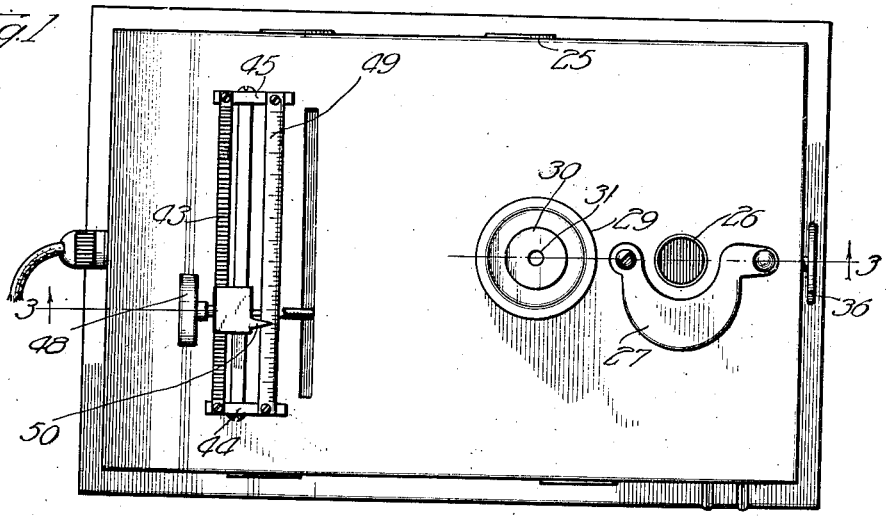
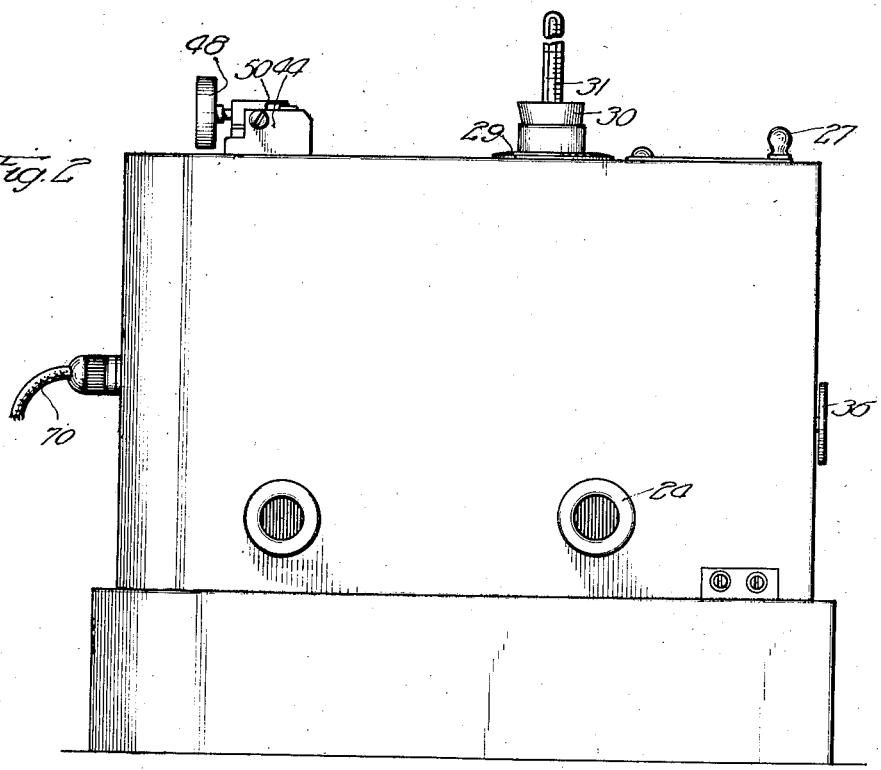
WITNESSES:
INVENTOR
Tiodolf Lidberg
BY
ATTORNEYS

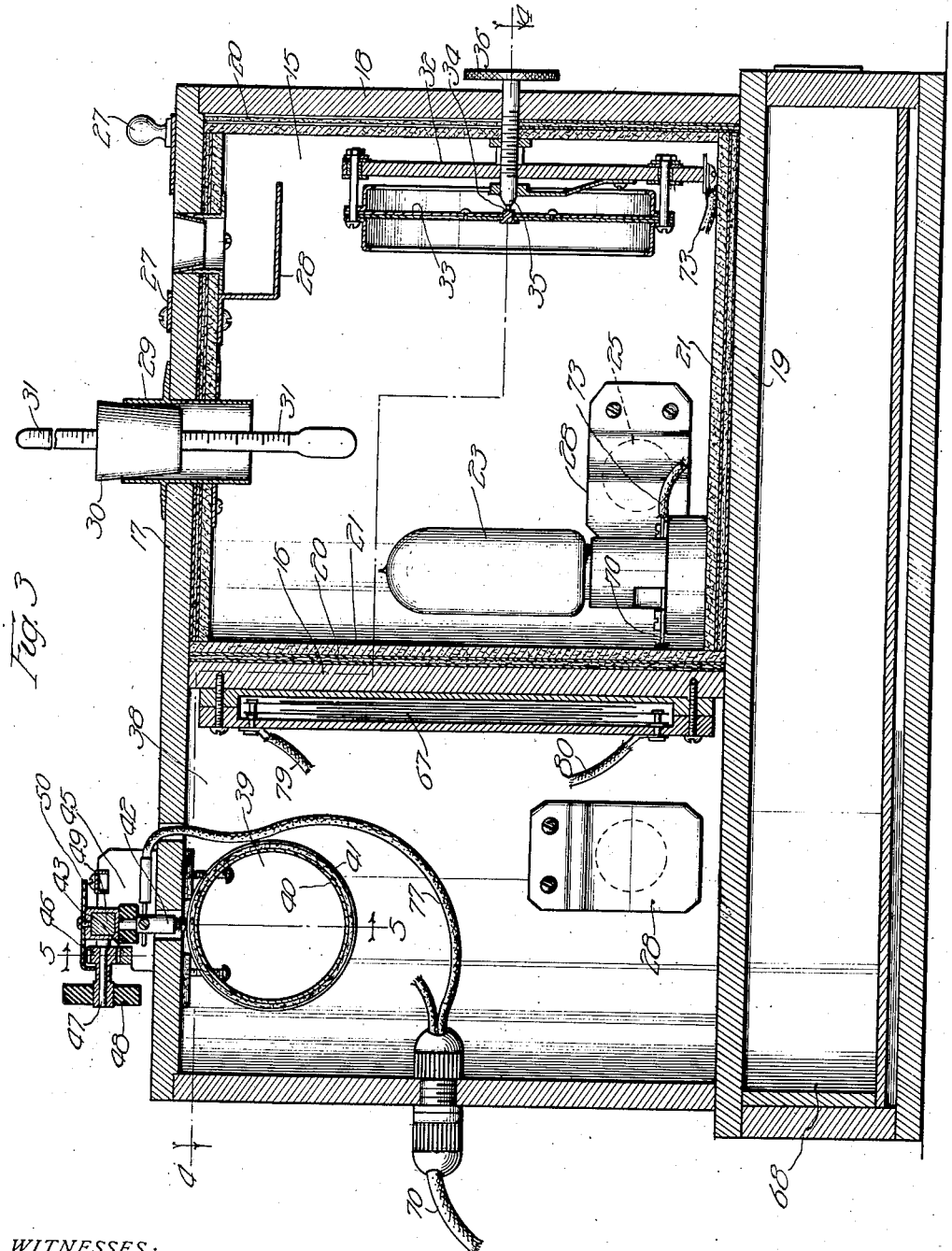

T. LIDBERG.
METHOD OF CONTROLLING TEMPERATURES.
APPLICATION FILED JAN. 9, 1919.
1,327,207.
Patented Jan. 6, 1920.
4 SHEETS—SHEET 3.
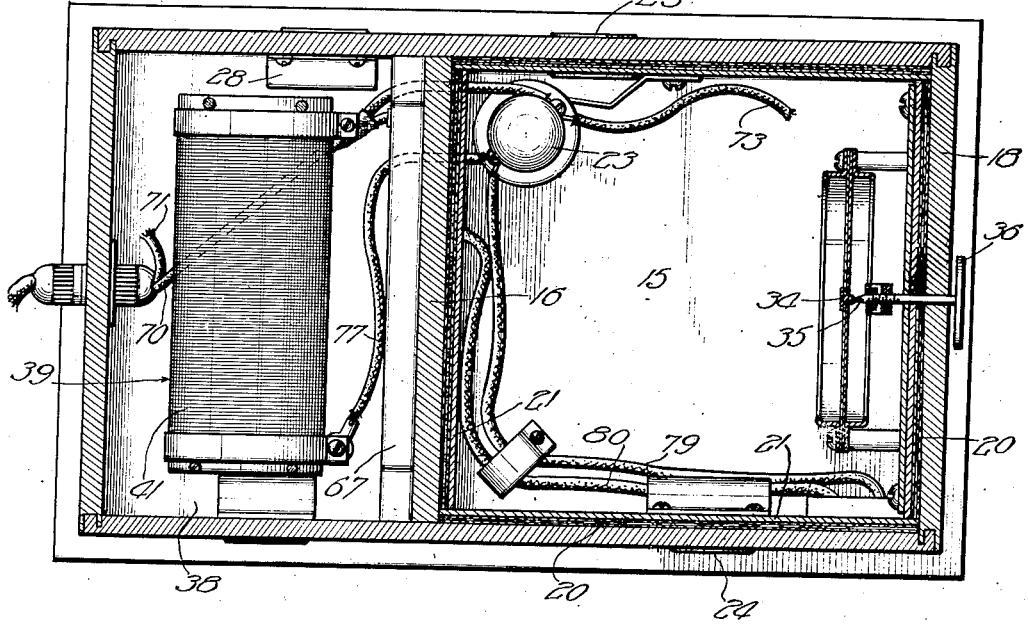
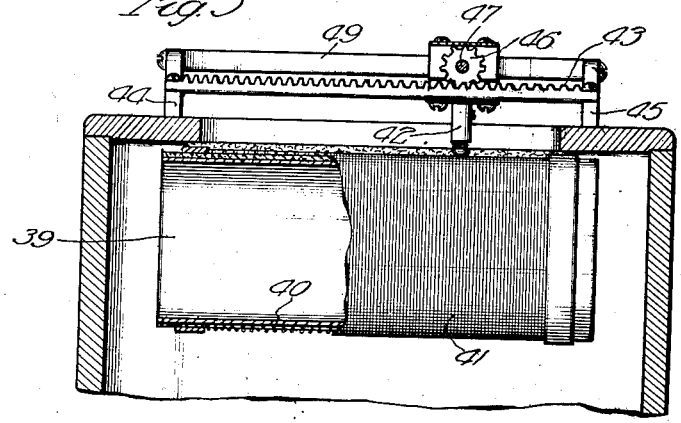
WITNESSES:
INVENTOR
Tiodolf Lidberg
BY
ATTORNEYS

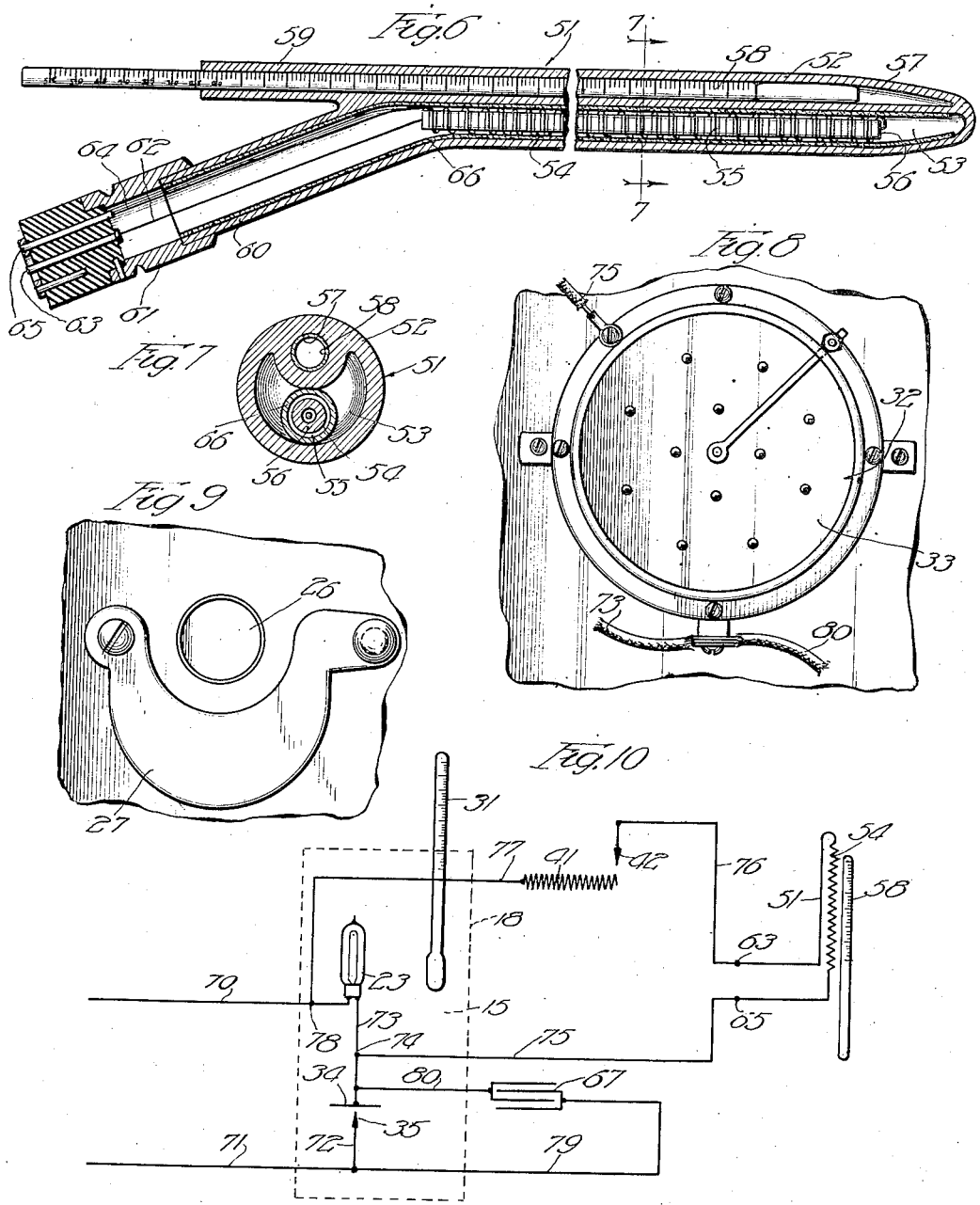

UNITED STATES PATENT OFFICE.

TIODOLF LIDBERG, OF CHICAGO, ILLINOIS, ASSIGNOR TO ELECTRO-THERMOPHORE COMPANY, OF CHICAGO, ILLINOIS, A CORPORATION OF ILLINOIS.

METHOD OF CONTROLLING TEMPERATURES.

1,327,207.  Specification of Letters Patent.  Patented Jan. 6, 1920.

Application filed January 9, 1919. Serial No. 270,278.

*To all whom it may concern:*

Be it known that I, TIODOLF LIDBERG, a citizen of the United States, residing at Chicago, in the county of Cook and State of Illinois, have invented certain new and useful Improvements in Methods of Controlling Temperatures, of which the following is a specification.

My invention relates to a method of and means for maintaining substantially constant temperature of a heating means from which heat is being constantly absorbed and conducted away by a surrounding medium.

One of the prime objects of my invention is to provide a method of procedure and means for maintaining constancy of temperature in a selected area or applicator and the provision of means for and mode of varying the degree of temperature constantly to be maintained therein.

My invention is especially applicable for use in bacteriological research work and for orificial surgery.

In the culture of micro-organisms and similar research work, it is extremely desirable to maintain the temperature within an applicator or other given area or zone substantially constant, within a very small fraction of a degree, and in the treatment of genito-urinary diseases, and other therapeutic thermal operations, it is highly important that the temperature of the heated applicator or zone shall be reliably controllable so that the maximum temperature may never rise to a danger point, even for a short period of time.

For destruction of gonococcus, and micrococcus and other micro-organisms the temperature of a heat applicator or sound inserted in the urethra or other orifice to accomplish the result, must be maintained at a relatively high temperature, just below that which would rupture or injure the tissue. It, therefore, is a matter of utmost importance to safeguard the patient by a reliable, unfailing means to prevent even a slight rise of temperature which would be the danger point. The margin of difference of temperature between that which is necessary to destroy the organisms referred to, and that which will dangerously injure the patient is very small and therefore the integrity of the means employed must be beyond question.

In carrying my invention into effect I provide a casing, relatively small, as best adapted for the purpose to which reference has heretofore been made, inclosing a test or balancing area to be heated and having heat insulating walls so that extraneous drafts and changing temperatures will have no material effect upon the temperature within the casing containing area to be heated, within the casing. In this chamber, the area to be heated, I place a heating means, such for example as an electric lamp and within the chamber, under the direct influence of the heating properties of the lamp, I locate an automatic electric switch, controlled by a heat responsive thermostat. The thermostat automatically opens and closes an electric circuit, by variation of temperature therein, for the electric current that effectuates the heating action and the source of heat within the chamber, and the heat applicator outside of the chamber, but it is affected only by the heat of the chamber. When the applicator is brought into contact with the human body which is at a lower temperature than that at which the applicator is to be maintained, heat is thus carried away from the applicator and additional heat must be supplied to the applicator in the same ratio as the heat is thus dispersed therefrom, in order that the temperature of the applicator shall remain constant.

In the casing, inclosing the test area to be heated, I provide one or more apertures near its bottom, for entrance of relatively cool air and near or in the top wall of the casing I provide another aperture for exit of the heated air and I also provide means for regulating the movement of air through the casing. By this means a controllable amount of heat may be carried away from the test area to be heated, by regulating the quantity of air passing through the casing within a given time, and thus this controllable test means is used for determining the temperature of the applicator, or uncontrollable means, when the ratio of heat dispersion of the test area to be heated, and the heat of the applicator, has been ascertained and established.

I have produced an apparatus by which my mode of procedure may very effectively be caried into operation, and which is fully illustrated in the accompanying drawings forming a part hereof, wherein:—

Figure 1 is a plan view of the instrument, not including the applicator.

Fig. 2 is a side elevation of the casing in which the test area to be heated is located.

Fig. 3 is a central section of the casing showing the contents thereof.

Fig. 4 is a section, taken on line 4—4 of Fig. 3.

Fig. 5 is an enlarged section taken on line 5—5 of Fig. 3.

Fig. 6 is a central sectional view of the heat applicator, or sound.

Fig. 7 is a large cross section taken on line 7—7 of Fig. 6.

Fig. 8 is an end elevation of the circuit controlling thermostat.

Fig. 9 is a valve regulating the draft of air through the aperture of the casing.

Fig. 10 is a diagram of circuits.

In all the views the same reference characters are employed to indicate similar parts.

15 is the secondary area to be heated, inclosed by a casing 18 having walls 16, 17, 18 and 19, the applicator hereafter described constituting the primary area to be heated. Within the walls is heat insulating lining 20 and an inner lining 21 which holds the insulating material in place. An electric lamp 23, affords a means for heating the area 15, within the casing 18, to the desired temperature. 24 and 25 are vent apertures to permit air to enter the casing and 26 is a vent, controllable by the valve or register 27, to permit a controllable amount of heated air to escape from the casing and permit cold air to enter to take its place. Shields, or baffle plates 28 are spaced away from the walls and overlie the apertures for the passage of air to prevent too sudden drafts of air through the casing so that the incoming air will be more evenly distributed or more uniformly heated. An aperture is made in the upper wall of the casing, including a thimble 29, in which is inserted a rubber plug, or stopper 30, having a central orifice through which the thermometer 31 is passed and within which it is retained in order to indicate on a graduated scale located outside of the casing, the temperature therein.

A thermostat 32, sensibly responsive to the heat of the area within the casing, is provided with a vibrating diaphragm 33, bearing an electrical contact 34 adapted to make electrical connection with the contact 35 on the end of the adjusting screw 36. The screw 36 when turned inwardly toward the diaphragm, modifies the operation of the heat responsive device so that the circuit will be opened at a higher temperature, by the effect of the warping diaphragm, and when the screw is turned in the opposite direction the circuit will be opened at a relatively lower temperature. Therefore, the temperature automatically maintained within the area 15 may be thus varied. The variation of temperature, within the area 15, thus produced, is affected by the relative length and number of the periods of time that the circuit is open with respect to the time that it is closed to energize the source of heat, by the heat responsive device.

For the purpose of convenience another compartment 38 is provided, adjacent the compartment 15, and this compartment contains the rheostat coil 39 consisting of a number of parallel convolutions of resistance wire, wound spirally upon a cylindrical insulating support 40. The wire 41 extends from end to end of the cylinder in spaced apart convolutions and is bare at the top surface of the convolutions which are adapted to be brought into electrical connection with the axially movable contact member 42, which is movable along a rack 43 supported on frame members 44 and 45. A pinion 46 is connected to a shaft 47, the outer end of which carries a thumb screw 48. By this means the contact member 42 may be moved to a selected position on the wire convolutions 41, to vary the resistance included within the applicator circuit, to be hereafter explained. The bar 49 is provided with a scale which, in coöperation with the index 50 that moves with the contact member, to indicate the amount of resistance introduced into the circuit. The electrical resistance, afforded by the wire 41 of the rheostat is included in series with the applicator or sound 51.

The sound or applicator 51 consists of a tube 52, having an axially extending compartment 53, within which to insert the heating element 54. The element consists of a coil 55 wound around a tubular insulating support 56. Another similar compartment 57, is provided within which to insert a thermometer 58. The outer end of the applicator tube is bifurcated into two branches, 59, containing a thermometer end 60 for connection of a terminal plug 61 and affording a handle for the applicator. The wire 62, of the heating coil, has one end connected to the central terminal 63 and the other end 64, connected with the ring terminal 65 of the plug. The compartment 53 of the applicator contains an insulating lining 66 within which the heating coil 54 is retained.

A condenser 67 is connected across the terminals 34 and 35 of the heat-responsive device, and is contained, preferably, in the compartment 38. The object of the condenser is to cut down the destructive effects of the spark between the terminals 34 and 35, as well understood by persons skilled in the art.

A drawer 68 may be contained in the lower part of the structure for the purpose of holding appliances or parts of the apparatus when they are not in use, such as the applicator, the connecting cord, etc.

A diagram of circuits is shown in Fig. 10, in which the main wires 70 and 71, connected to a suitable source of current supply, such as the service wires of an electric circuit, contain the two heating sources 23 and 51 in parallel, as clearly shown. The lamp 23, which heats the area 15, is included within the casing 18, while the coil 54 of the applicator is not within the casing but is connected to the apparatus by means of the connecting plug 61 and suitable plug receptacle within which it is contained.

The use of the device is substantially as follows:—When the device is connected to a suitable source of current supply, the circuit is closed, through contacts 34 and 35 and the lamp 23 will be lighted and produce more or less heat, which will raise the temperature of the test area 15, within the casing 18. Now when the circuit is first closed, through the lamp 23, it is best to have the valve or register 27 fully overlying the apertures 26 to retain the heat within the casing 18 until the circuit is opened by means of the automatically operating thermostat 32. When the heat within the area 15 has reached a certain temperature, the diaphragm 33, of the thermostat 32, will be warped so that the contact 34 no longer touches the adjustable contact 35 of the screw 36, and therefore the circuit will thereby be opened and the temperature within the heated area will decrease. The temperature at which this occurs will depend somewhat upon the adjustment of the screw 36. By screwing it inwardly, it will require a higher temperature to sufficiently warp the diaphragm of the thermostat and by screwing it outwardly, it will require less heat to accomplish the same effect. Now, however, if the valve 27 is opened, to a greater or less extent, then the heated air within the area 15 will escape, or the heat will be dispersed by the outgoing air and the temperature within the casing 18 will fall more rapidly than when the valve 27 is not so completely closed. As the air escapes through the vent, controlled by the register or valve 27, fresh relatively cold air will enter the apertures 24 near the bottom of the casing 18 and therefore, to maintain a constant or given temperature within the area 15, with all of the vents open, there must be an established ratio between the aggregate length of time periods that the circuit will be closed, by the thermostat, and the amount of air dispersed or conducted away from the area 15, in conjunction with that which is admitted. When the valve 27 is fully opened, then the aggregate periods of time that the circuits will be closed by the diaphragm 33 is greater than when the valve is only partly opened or entirely closed. Therefore, we have a test means for maintaining a given temperature with a constant dispersion, or conducting away, of the heat from that area. Now when the applicator 51 is applied to the human body, the heat will be carried away from it at a definite ratio and inasmuch as the extent or rapidity with which the heat may be carried away from the heated area 15, is controllable, the ratio between the effect produced in the casing 15 and that in the applicator, may be easily established, by the manipulation of the valve 27 and by the adjustment of the rheostat screw 37, by either or by both. Now as the temperature of the area 15, is controlled by the diaphragm 34 of the thermostat, by varying the periods of time that the lamp 23 will be energized, and inasmuch as the same means controls the heat supplied to the applicator 51, it logically follows that if the dispersion of heat from the area 15 is maintained in proportion to the dispersion of heat from the applicator 51, then the heat of the respective areas to be heated, will be correspondingly uniform and constant.

When it is desired to increase or decrease the relative heat in the applicator 51, it may be accomplished by changing the effective resistance 41 included in the circuit therewith. This may be done without having any modifying effect upon the results produced in the area 15, by manipulation of the rheostat.

The apparatus may be used for ascertaining the activity of the blood stream of individuals in a manner that will become readily apparent from the foregoing description, and for many other purposes that will readily occur to persons who are skilled in the art of its manipulation.

In the diagram, Fig. 10, the current is easily traced from the wire 71 to the wire 72, through the automatic thermostat 32 and by the wire 73 to the lamp 23 and through the lamp to the wire 70. The other branch of the circuit starts at the wire 73, at the point 74, and continues over the wire 75 to the coil 54 of the applicator 51, and through the applicator over the wire 76 to the movable contact 42 of the rheostat 41 and from the coil 41 over the wire 77 to the point 78 of the wire 70. Thus including the lamp 23 and the coil 54 in parallel circuit, and including the condenser 67 across the terminals 34 and 35 of the thermostat. The thermometer 58, within the applicator 51, projects sufficiently from the end of the applicator to enable the operator to ascertain the temperature at which the applicator is heated and the thermometer 31, within the area 15, indicates the temperature therein.

While I have herein shown a single embodiment of my invention, and a means for carrying it into effect, it will be manifest, to persons skilled in the art, that many changes in the arrangement and general configuration of the parts may be made within the scope of the appended claims.

Having described my invention, what I claim is:—

1. The method of maintaining constant the temperature of a primary area from which heat is being conducted which consists in providing a secondary area to be heated and from which heat may be conducted; and automatically controlling the heat supplied to both areas by a heat responsive device within the secondary area.

2. The method of maintaining constant the temperature of the primary area from which heat is being conducted, which consists in providing a secondary area to be heated and from which heat may be conducted; automatically controlling the heat supplied to both areas, by a heat responsive device within the secondary area, and varying the heat carried away from the secondary area until a ratio is established between the two areas.

3. The method of maintaining constant the temperature of the primary area from which heat is being conducted, which consists in providing a secondary area to be heated and from which heat may be conducted; automatically controlling the heat supplied to both areas, by a heat responsive device within the secondary area and balancing the heat variation of the two areas.

4. The method of maintaining constant the temperature of the primary area from which heat is being conducted which consists in providing a secondary area to be heated and from which heat may be conducted; automatically controlling the heat supplied to both areas by a heat responsive device within the secondary area and establishing a ratio of radiation of the two areas.

5. The method of maintaining constant the temperature of an electrically heated applicator from which heat is being dispersed which consists in heating an area by electrical means; carrying away the heat from the heated area in a ratio comparable with that of the applicator and automatically controlling the current supplied to both heating means by a thermo-responsive device affected by said secondary heated area.

In testimony whereof I hereunto subscribe my name.

TIODOLF LIDBERG.